R. W. PAIN.
Tremolos for Reed-Organs.

No. 164,869.

Patented June 22, 1875.

UNITED STATES PATENT OFFICE.

ROBERT W. PAIN, OF NEW YORK, N. Y., ASSIGNOR TO E. P. NEEDHAM & SON, OF SAME PLACE.

IMPROVEMENT IN TREMOLOS FOR REED-ORGANS.

Specification forming part of Letters Patent No. 164,869, dated June 22, 1875; application filed March 25, 1875.

*To all whom it may concern:*

Be it known that I, ROBERT W. PAIN, of New York, in the county and State of New York, have invented an Improvement in Organs; and I do hereby declare that the following is a full, clear, and exact description of the same, reference being had to the accompanying drawing, forming part of this specification:

My invention relates to an improved tremolo apparatus, which is intended more particularly for application to reed-organs and similar instruments, but which may also be applied to pipe-organs.

My invention consists in a revolving tremolo-wheel or cutter arranged outside of the swell-chamber, which latter is provided with an opening at the side on which the tremolo-wheel is located, whereby the air is alternately partially cut off or shut in and let out by the revolution of said wheel by and past the opening in the swell-chamber.

Figure 1:
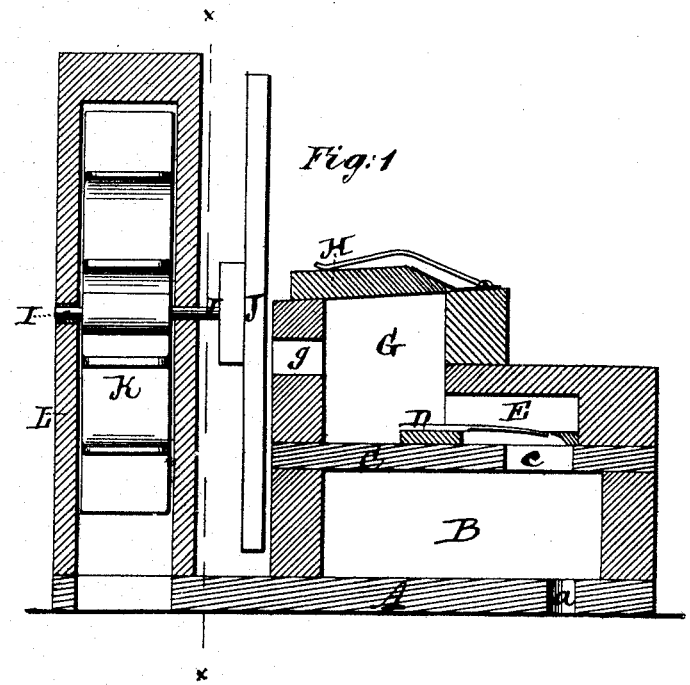
Figure 2:
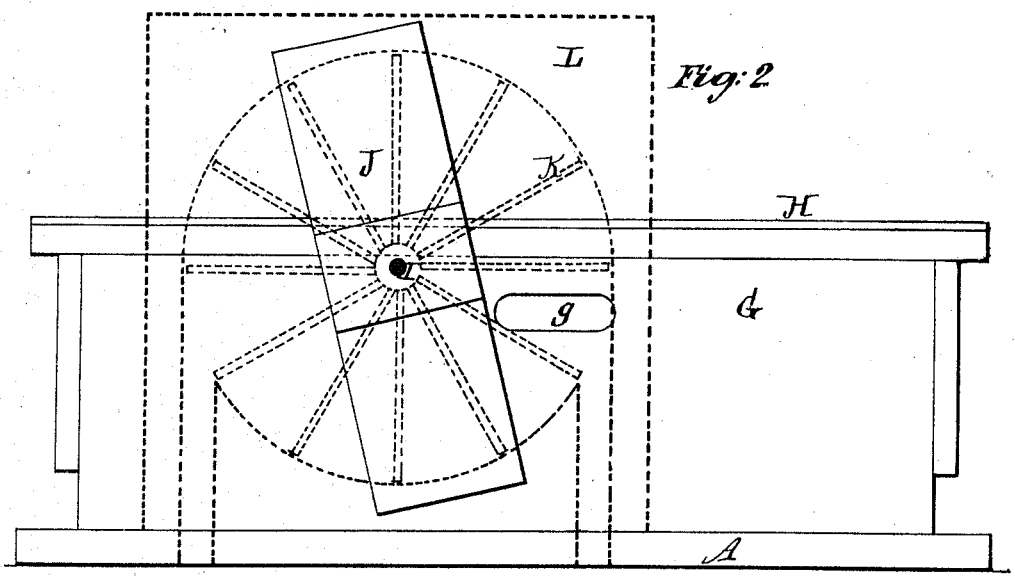

In the accompanying drawing, Figure 1 is a transverse vertical section of a portion of a reed-organ with my invention applied thereto. Fig. 2 is a vertical section taken in the line $x$ $x$ of Fig. 1.

A represents the top of the wind-receiver, in which is an opening, $a$, to allow of communication between said receiver and the space B. The reed-board C carries the reeds D, immediately under each of which is an opening, $c$, for the passage of the wind through the reeds. E is a valve-chamber; G, the swell-chamber, and H the swell. All the above parts are of the ordinary construction, and are arranged with relation to each other in the usual or any suitable manner. In the rear side of the swell-chamber is an opening, $g$, for the passage of the wind. A revolving tremolo-wheel or cutter, J, composed of blades, attached to a suitable shaft, I, is arranged outside of the swell-chamber, to revolve outside of the swell-chamber and opposite the opening $g$, so as to intermittently cut off or interrupt the current of wind passing through said opening, and thus cause a vibration in the sound produced by the passage of the wind through the reed. The tremolo-wheel or cutter may be formed of one or more blades, according to the speed at which it is desired to revolve, or the rapidity of the vibrations of sound which it is desired to produce by its revolution. It is herein shown as formed with two blades, extending equidistant from the shaft in opposite directions. The width of the blade is much greater than its thickness, and it revolves edgewise, in order to facilitate its rapid revolution, and to render more positive the vibrations produced thereby. The revolving tremolo-wheel or cutter may have motion imparted to it in any suitable manner. The means shown herein consists of a fan-wheel, K, attached to the shaft I, and inclosed in a casing or fan-chamber, L, communicating with the wind-chest, and provided with wind-ports furnished with suitable valves, regulated by a pedal or stop, by which means the wind may be admitted to or shut off from the fan-chamber at the pleasure of the operator; and thus the fan-wheel may be driven and the tremolo-wing operated by means of the current of wind produced by the bellows of the instrument.

What I claim as new, and desire to secure by Letters Patent, is—

The combination with the swell-chamber G, having an opening, $g$, in its side, of the revolving tremolo-wheel J, arranged outside of the swell-chamber, and the whole constructed substantially as described, whereby the air is alternately partially shut in and let out of the swell-chamber by the revolution of the said wheel, as set forth.

ROBERT W. PAIN.

Witnesses:
HENRY T. BROWN,
MICHAEL RYAN.